UNITED STATES PATENT OFFICE.

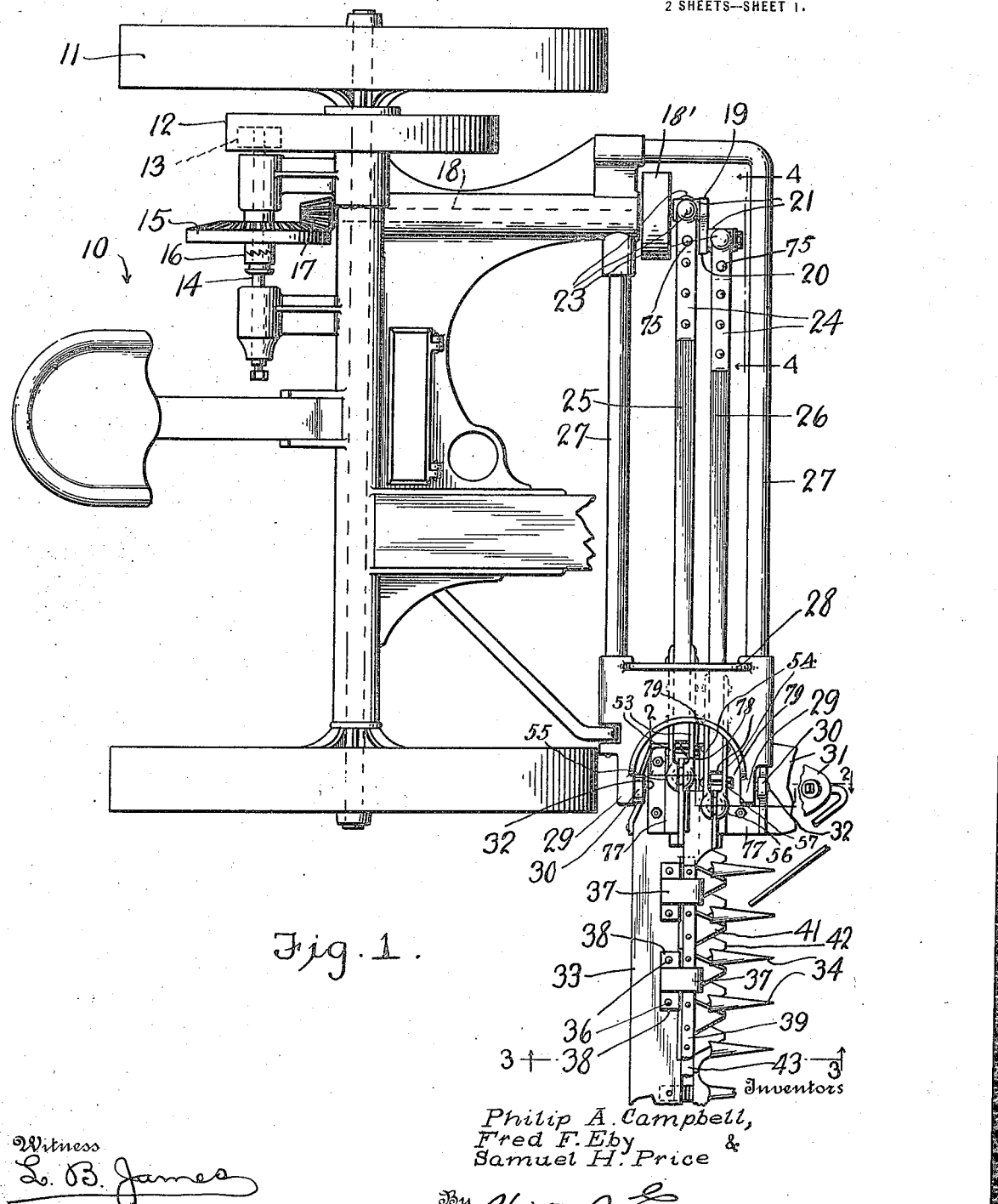

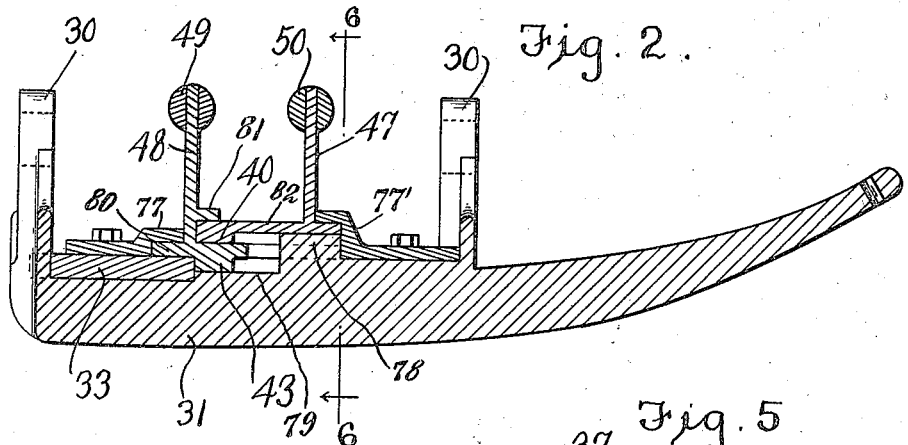
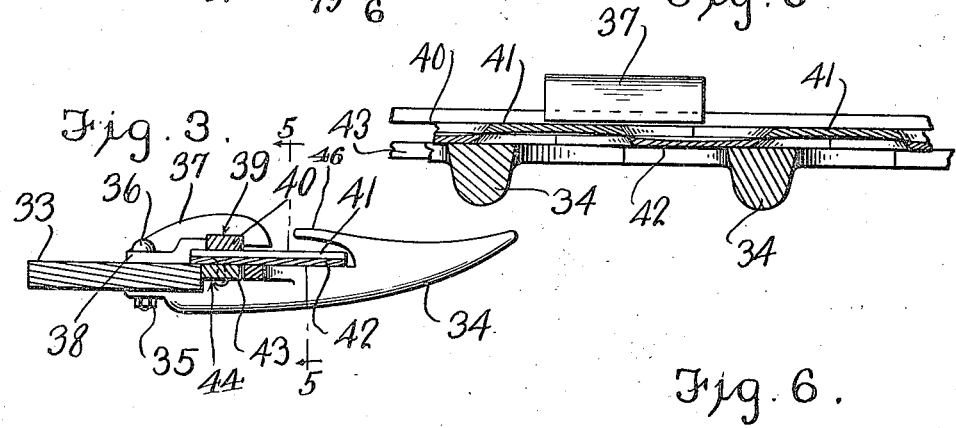
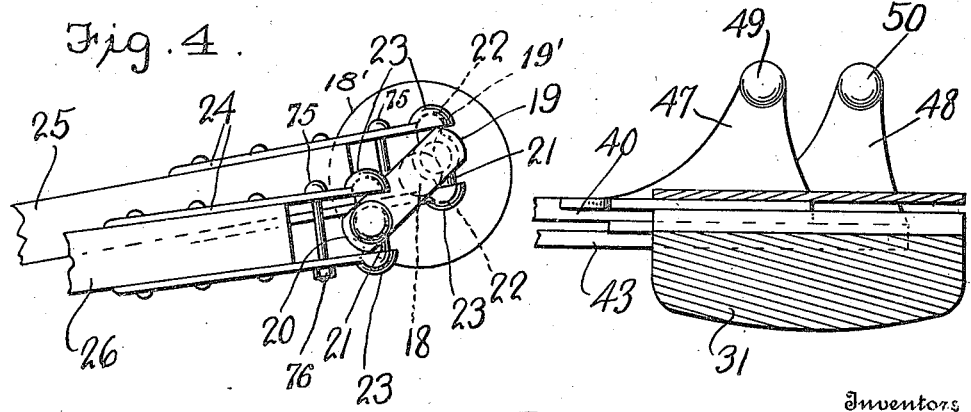

PHILIP A. CAMPBELL, FRED F. EBY, AND SAMUEL H. PRICE, OF EDMONTON, ALBERTA, CANADA; SAID CAMPBELL AND PRICE ASSIGNORS, BY MESNE ASSIGNMENTS, TO CANADIAN FARM IMPLEMENT COMPANY, LIMITED, OF VANCOUVER, BRITISH COLUMBIA, CANADA, A CORPORATION OF CANADA.

MOWER.

1,424,617.      Specification of Letters Patent.      Patented Aug. 1, 1922.

Application filed January 18, 1919. Serial No. 271,846.

*To all whom it may concern:*

Be it known that we, PHILIP A. CAMPBELL, a subject of the King of Great Britain, FRED F. EBY, a citizen of the United States of America, and SAMUEL H. PRICE, a citizen of the United States of America, residing at Edmonton, in the Province of Alberta and Dominion of Canada, have invented new and useful Improvements in Mowers, of which the following is a specification.

This invention has reference to improvements in mowing machines.

The primary object of the invention is to provide a mowing machine with two co-operating series of knives arranged between the guard fingers of the machine and to provide means whereby each series of knives may be simultaneously reciprocated in opposite directions, thus severing the herbage directly between the cutting edges of the co-operating knives in counterdistinction to the usual manner of cutting the herbage between the edge of a knife and the dull edge of the stationary guard finger.

Many other objects and advantages will present themselves as the nature of the invention is better understood, reference being had to the accompanying drawings in which there is illustrated a simple and satisfactory reduction of the improvement as reduced to practice.

In the drawings:

Figure 1 is a plan view of a mower constructed in accordance with this invention.

Figure 2 is a greatly enlarged sectional view approximately on the line 2—2 of Figure 1.

Figure 3 is a similar sectional view approximately on the line 3—3 of Figure 1.

Figure 4 is a similar sectional view approximately on the line 4—4 of Figure 1.

Figure 5 is a sectional view approximately on the line 5—5 of Figure 3.

Figure 6 is a sectional view approximately on the line 6—6 of Figure 2.

On the frame 10 of the machine is journaled the axle on which is secured the traction wheels 11. The axle has feathered or keyed thereon a wheel 12 provided with an internal gear that meshes with a pinion 13 secured on a shaft 14 journaled in suitable bearings formed on the frame. On this shaft is loosely arranged a beveled toothed wheel 15 under the control of a clutch 16 that is feathered on the shaft 14, suitable operating means for the clutch being provided, but not being shown. The beveled toothed wheel 15 meshes with a beveled pinion 17 on a shaft 18 arranged longitudinally of the frame and which is journaled in suitable bearings. On the outer end of the shaft 18 there is a flat wheel 18'. Secured eccentrically to the wheel 18', and projecting outward therefrom is a stub shaft 19'. On the outer end of the stub shaft 19' there is a crank arm 19 that has adjacent its free end an outwardly extending stub shaft 20. On the respective stub shafts 19' and 20 there are centrally journaled comparatively short arms 21 respectively that have their ends provided with ball heads 22. It is to be noted that the stub shaft 20 is farther away from the axial center of the wheel 18' than is the stub shaft 19 and consequently the stub shaft 20 will have a greater sweep than the stub shaft 19', when the shaft 18 is revolved.

The numerals 25 and 26 indicate pitmen. On the opposite edges at the free ends of the pitmen there are secured metallic plates or straps 24 respectively. The ends of these plates or straps project a considerable distance beyond the ends of the pitmen, and the outer ends of the said plates or straps are formed with cup-shaped bearings 23 that receive the ball heads on the respective stub shafts 19' and 20. Between the pairs of straps or plates 24, outward of the pitmen there are passed bolts 75 that are engaged by nuts 76. In this manner, the frictional engagement of the cup-shaped bearings with the ball heads of the arms are regulated.

The frame 10 supports, at the outer end thereof, spaced bars 27, between which the pitmen are arranged. The bars are arranged at a downward inclination, and have secured to their lower ends a hollow head member 28. The upper and outer surface of the head member 28 is concaved inwardly, providing the sides thereof with what may be termed arms and which are designated by the numeral 29. The inner shoe member is indicated by the numeral 31, and is provided with upstanding lugs 30 which are pivoted to the arms 29 of the head by elements 32.

On the shoe, at the rear thereof is secured the finger bar 33, the same having at its outer end the usual shoe (not shown). Secured to the finger bar, at spaced intervals are the guard fingers 34. These fingers, of course, project beyond the outer edge of the bar and the said fingers are oval in cross section and are arched or rounded from their lower surface to their points. Each of the fingers 34 is notched to receive the finger bar 33, and the lower portions of the said fingers below the said notches are preferably reduced so that the nuts 35 which engage with the bolts 36 that secure the fingers to the bar will not drag on the ground. The bar 33 is snugly received in the notches in the fingers, so that when the bolts are attached the said fingers will be held against lateral movement. The bolts 36, in addition to securing the guard fingers to the finger bar provided attaching means for keeper members 37. These members 37 project outwardly from the bar 33 and are provided, upon their inner ends with lateral flanges 38, and it is through these flanges that the bolts 36 pass. The keepers 37 have their under faces notched as at 39 and the said notched portions receive therethrough the upper sickle bar 40. On the bar 40 are riveted or otherwise secured cutting knives 41, and these knives have their under faces disked or concaved from the center to the angle cutting edges thereof. The knives 41 overlie coacting knives 42 which have their upper faces concaved from the center to the angular cutting edges thereof, the said blades 42 being secured upon a sickle bar 43 that is received in depression 44 in the upper face of the body portions of the guard fingers 34, the inner edge of the said bar 43 contacting with the inner edge of the finger bar 33. The fingers 34 are provided with the usual slots or openings through which the reciprocating knives 41 and 42 pass when the bars 40 and 43 are reciprocated, the said fingers having guard members 46 which overlie the knives. As the confronting faces of the knives are dished to the center thereof, and consequently the sharpened cutting edges thereof are in contacting engagement, it will be apparent that the frictional engagement of the knives, in the reciprocation thereof will tend to sharpen the same.

The shoe 31 is formed with an upstanding transverse lug 78 disposed a suitable distance away from the portion thereof to which the finger bar 33 is connected. The wall 79 between the lug 78 and the edge of the finger bar provides a bearing surface for the sickle bar 43. The sickle bar has a horizontal flange 80 that rests on the upper face of the finger bar 33, at the portion thereof secured to the shoe 31. This horizontal flange 80 is engaged by the lip of a guide member 77, which is bolted or otherwise secured to the finger bar and to the shoe. The sickle bar 43, at the portion thereof received on the shoe 31 has an upstanding plate 48, the outer face of which has a horizontal flange 81 disposed over the sickle bar 40. The sickle bar 40, at the portion thereof arranged over the shoe rests on the upper face of the sickle bar 43, and is arranged below the horizontal flange 81. This portion of the sickle bar is widened, as at 82, and the under face of the said widened portion rests on the flat upper face of the lug 78. The widened or flanged portion 82 of the sickle bar 40 has its outer edge and upper surface engaged by a lip on a guide bracket 77' that is bolted or otherwise secured to the upper face of the shoe 31. The widened portion or flange 82 of the sickle bar 40 has an upstanding plate 47, the outer face of which is contacted by the lip of the guide bracket 77'. The upstanding plates 47 and 48 on the respective sickle bars 40 and 43 are each provided at its upper edge with a ball head. The ball head for the plate 48 is indicated by the numeral 49 and that for the plate 47 by the numeral 50.

On the sides of the pitmen which are received in the hollow head 28 there are secured flat spring plates 53 and 54 respectively. These pairs of plates have their outer ends provided with cup-shaped bearings 55 and 56 respectively. Between the pairs of plates 53 and 54, beyond the ends of the pitmen 25 and 26 are adjustable binding means 57 for regulating the frictional engagement of the bearings with respect to the ball heads received therebetween.

From the foregoing description, when taken in connection with the drawings it will be seen that the sickle bars are effectively supported and guided when reciprocated over the inner shoe and when reciprocated along the finger bar. The means for connecting the pitmen to the drive shaft and to the sickle bars materially reduces friction between these bars and at the same time permits of the ready removal of the pitmen bars from the remainder of the structure should either of the said pitmen become injured. The pitmen are at all times retained in longitudinal alignment, and as previously stated the concaved confronting surfaces of the cutting knives cause the same to be automatically sharpened in the reciprocation thereof.

Having thus described the invention, what is claimed as new, is:—

In a mowing machine, a wheeled frame, a hollow head carried thereby, a shoe pivotally secured to the head, said shoe having its upper edge at its rear end depressed and being formed outward of the depression with a transverse lug, a finger bar secured in the depression, guard fingers thereon having their upper faces recessed, a lower sickle bar contacting the edge of the finger bar received in the recesses and resting on the shoe inward of the lug, a second sickle bar disposed over the first mentioned sickle bar, cutting blades on the confronting faces of the sickle bars, having their confronting faces concaved inwardly from their cutting edges, notched keeper members secured on the finger bar and receiving the upper sickle bar, said upper sickle bar at the portion thereof overlying the shoe having a widened portion which rests on the lug of the shoe, the lower sickle bar at the portion thereof arranged over the shoe having a lateral flange which rests on the portion of the finger bar connected to the shoe, lipped guide members secured to the shoe contacting tne outed edges of the widened and flanged portions of the sickle bars and resting thereover, upstanding plates on the flanged or widened portions of both of the sickle bars, a flange on the plate for the lower sickle bar overlying the upper sickle bar, ball heads on the upstanding plates of both of the sickle bars, pitmen rods having their ends received in the hollow head, metallic straps projecting therefrom and having cup sockets to receive the respective ball heads, means for compressing the respective pairs of straps for regulating the frictional engagement between the sockets and the heads, a shaft revoluble on the machine, a flat wheel on the front end thereof, a stub shaft projecting therefrom, an arm centrally journaled thereon and having its end provided with ball heads, a link secured to the stub shaft, a stub shaft on the outer end of the link, an arm centrally journaled on the second mentioned stub shaft and having its ends provided with ball heads, and strap members on the respective pitmen extending therefrom and having cup-shaped sockets receiving the ball heads of the respective arms, and compressing means for the respective pairs of straps.

In testimony whereof we affix our signatures.

PHILIP A. CAMPBELL.
FRED F. EBY.
SAMUEL H. PRICE.